United States Patent [19]

Gugel et al.

[11] Patent Number: 5,109,718
[45] Date of Patent: May 5, 1992

[54] APPARATUS AND METHOD FOR TESTING A VESSEL WALL

[75] Inventors: Georg Gugel, Kalchreuth; Martin Haefner, Erlangen; Rainer Bauer, Herzogenaurach; Peter Krauss, Spardorf, all of Fed. Rep. of Germany

[73] Assignee: Siemens Aktiengesellschaft, Munich, Fed. Rep. of Germany

[21] Appl. No.: 525,191

[22] Filed: May 17, 1990

[30] Foreign Application Priority Data

May 17, 1989 [DE] Fed. Rep. of Germany ....... 3916061

[51] Int. Cl.⁵ ............................................ G01M 19/00
[52] U.S. Cl. ...................................... 73/866.5; 376/249
[58] Field of Search ................. 73/866.5, 865.8, 865.9, 73/104, 636; 376/249

[56] References Cited

U.S. PATENT DOCUMENTS

| 3,644,922 | 5/1972 | Diwinski et al. | 376/249 |
| 3,830,480 | 8/1974 | Grant | 73/866.5 X |
| 4,117,733 | 10/1978 | Gugel | 73/640 X |
| 4,155,243 | 5/1979 | Elsner | 73/623 X |
| 4,158,309 | 6/1979 | Elsner et al. | 73/641 |
| 4,170,891 | 10/1979 | Elsner | 73/1 R |
| 4,385,523 | 5/1983 | Gugel et al. | 73/640 |
| 4,638,667 | 1/1987 | Zimmer et al. | 73/866.5 |

FOREIGN PATENT DOCUMENTS

| 2506415 | 8/1976 | Fed. Rep. of Germany | 376/249 |
| 2537613 | 3/1977 | Fed. Rep. of Germany | . |
| 2557992 | 6/1977 | Fed. Rep. of Germany | 73/634 |
| 2636246 | 2/1978 | Fed. Rep. of Germany | . |
| 2712060 | 12/1978 | Fed. Rep. of Germany | . |
| 2733946 | 2/1979 | Fed. Rep. of Germany | . |
| 2737449 | 2/1979 | Fed. Rep. of Germany | 376/249 |
| 2849763A1 | 5/1980 | Fed. Rep. of Germany | 73/866.5 |
| 2913742 | 10/1980 | Fed. Rep. of Germany | . |
| 3035502 | 4/1982 | Fed. Rep. of Germany | 73/866.5 |
| 8025194 | 2/1983 | Fed. Rep. of Germany | 73/866.5 |
| 3044788 | 6/1984 | Fed. Rep. of Germany | . |
| 2849763 | 11/1984 | Fed. Rep. of Germany | . |
| 3508415 | 9/1986 | Fed. Rep. of Germany | . |
| 3524390 | 1/1987 | Fed. Rep. of Germany | . |
| 3524857 | 1/1987 | Fed. Rep. of Germany | . |
| 3732783 | 4/1989 | Fed. Rep. of Germany | . |
| 174790 | 10/1984 | Japan | 376/249 |
| 105044 | 5/1987 | Japan | 73/634 |

OTHER PUBLICATIONS

"Ultrasonic Equipment for Inspection of Reactor Pressure Vessels in Service"; *Non-Destructive Testing;* vol. 7, No. 1, pp. 19-24, Feb. 1974; H. J. Meyer et al. in 73/623.

Kerntechnik, 13th Year (1971), No. 2, pp. 56-68; H.—J. Meyer: "Ultrasonic In-Service Inspection of Reactor Pressure Vessles".

*Primary Examiner*—Tom Noland
*Attorney, Agent, or Firm*—Herbert L. Lerner; Laurence A. Greenberg

[57] ABSTRACT

An apparatus for testing a vessel wall includes a rail and a carriage running on the rail. An inclining and swiveling telescoping arm has an end being pivotably connected to the carriage and a free end. The telescoping arm has curved members with U-shaped cross sections. A drive mechanism for extending and retracting the telescoping arm includes a pusher tube having tensile strength and resistance to compression for driving the members in common and a motor for driving the pusher tube. A test unit is carried by the free end of the telescoping arm and a data line is connected between the test unit and an evaluation unit.

17 Claims, 4 Drawing Sheets

APPARATUS AND METHOD FOR TESTING A VESSEL WALL

BACKGROUND OF THE INVENTION

1. Field of the Invention

The invention relates to a method and apparatus for testing a vessel wall, especially a vessel lid with protrusions, including an inclinable, swivelable telescoping arm having a drive mechanism and being pivotably connected to a carriage to be driven on a rail, and a test unit carried by the free end of the telescoping arm being connected to an evaluation device at least through a data line.

2. Description of the Related Art

German Patent DE-PS 30 44 788 C2 discloses an apparatus that includes a test carriage which is movable along a guide rail for testing a reactor pressure vessel bottom provided with supports. A telescoping outrigger of variable length is inclinably and swivelably attached to the test carriage. Disposed on the free end of the telescoping outrigger is a test head which is resiliently supported on the bottom of the reactor pressure vessel. The telescoping outrigger is pressed against the bottom of the vessel by a tensioning device and is extended by means of a motor-driven steel belt. The retraction of the telescoping outrigger is accomplished by means of a toothed belt provided with a second drive mechanism. Only a slightly curved vessel surface can be tested with this apparatus from a fixed position of the test carriage. In the case of major curvatures, the guide rail must be guided directly along the contour of the vessel surface.

It is accordingly an object of the invention to provide an apparatus and method for testing a vessel wall, which overcome the hereinafore-mentioned disadvantages of the heretofore-known methods and devices of this general type and which provide a way of testing a markedly curved vessel wall to which access is very difficult, for instance because there is very little room in which to work.

SUMMARY OF THE INVENTION

With the foregoing and other objects in view there is provided, in accordance with the invention, an apparatus for testing a vessel wall, especially a vessel lid with protrusions, comprising a rail, a carriage running on the rail, an inclining and swiveling telescoping arm having an end being pivotably connected to the carriage and a free end, the telescoping arm having curved members with U-shaped cross sections, a drive mechanism for extending and retracting the telescoping arm including a pusher tube having tensile strength and resistance to compression for driving the members in common and a motor for driving the pusher tube, a test unit carried by the free end of the telescoping arm, an evaluation unit, and a data line connected between the test unit and the evaluation unit.

In this way, a structure is attained that is simple, space-saving, flat and at the same time stable, and which permits testing of even markedly curved vessel walls, such as reactor pressure vessel lids, that may be surrounded at a short distance by insulation. The flat structure of the apparatus makes it possible for the telescoping arm and test unit to be thrust between the reactor pressure vessel lid and the insulation. The flexion of the telescoping arm is adapted to the curvature of the lid of the reactor pressure vessel. The space-saving structure of the manipulator makes it especially suitable for testing narrow lanes or corridors, such as those formed by supports of control rod drive mechanisms in reactor pressure vessel lids. The apparatus is also suitable for test surfaces that are curved transversely to the direction of extension of the telescoping arm, because the apparatus has good lateral stability due to its stable construction.

In accordance with another feature of the invention, there is provided a drum rotatably disposed on the pivotably connected end of the telescoping arm, the pusher tube being a toothed belt in the telescoping arm having a first end connected to the free end of the telescoping arm and a second end guided on the drum, and the motor being part of a gear mechanism on the pivotably connected end of the telescoping arm for force-locking engaging the pusher tube. This makes it possible to use the apparatus according to the invention for working in particularly close quarters.

In accordance with a further feature of the invention, the data line runs through the inside of the pusher tube, so that an extra cable channel can be dispensed with. The pusher tube may have a diameter of from 20–30 mm and in particular 24 mm.

In accordance with an added feature of the invention, the curved members with U-shaped cross sections have U-legs with ends and inwardly pointing guide elements on the ends of the U-legs. This permits precise guidance of the apparatus along the surface of the vessel.

In accordance with an additional feature of the invention, at least the outer member of the telescoping arm may have a width greater than its height. As a result, the apparatus can be quite flat, for very close working quarters, and particularly good lateral stability is attained.

In accordance with yet another feature of the invention, the pusher tube has a square cross section and recesses formed therein.

In accordance with yet a further feature of the invention, the pusher tube has recesses formed therein, transverse slits each having a bottom and being contiguous with a respective one of the recesses, and rounded portions each being contiguous with the bottom of a respective one of the transverse slits.

In accordance with yet an added feature of the invention, there are provided guide channels nested telescopingly in one another inside the telescoping arm, the pusher tube being disposed in the guide channels.

In accordance with a concomitant feature of the invention, the curved members with U-shaped cross sections have a circular radius of approximately 2 to 10 m and preferably 2.5 m.

With the objects of the invention in view, there is also provided a method for testing a vessel wall or lid with protrusions, which comprises moving a carriage on a rail with a drive unit, inclining and swiveling a telescoping arm on the carriage, testing the vessel surface with a test unit disposed on a free end of the telescoping arm and connected through a data line to an evaluation unit, while moving the carriage and inclining and swiveling the telescoping arm, and extending and retracting the telescoping arm with a pusher tube connected to the telescoping arm and a motor connected to the pusher tube. The method can also be used in very close working quarters.

Other features which are considered as characteristic for the invention are set forth in the appended claims.

Although the invention is illustrated and described herein as embodied in an apparatus and method for testing a vessel wall, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
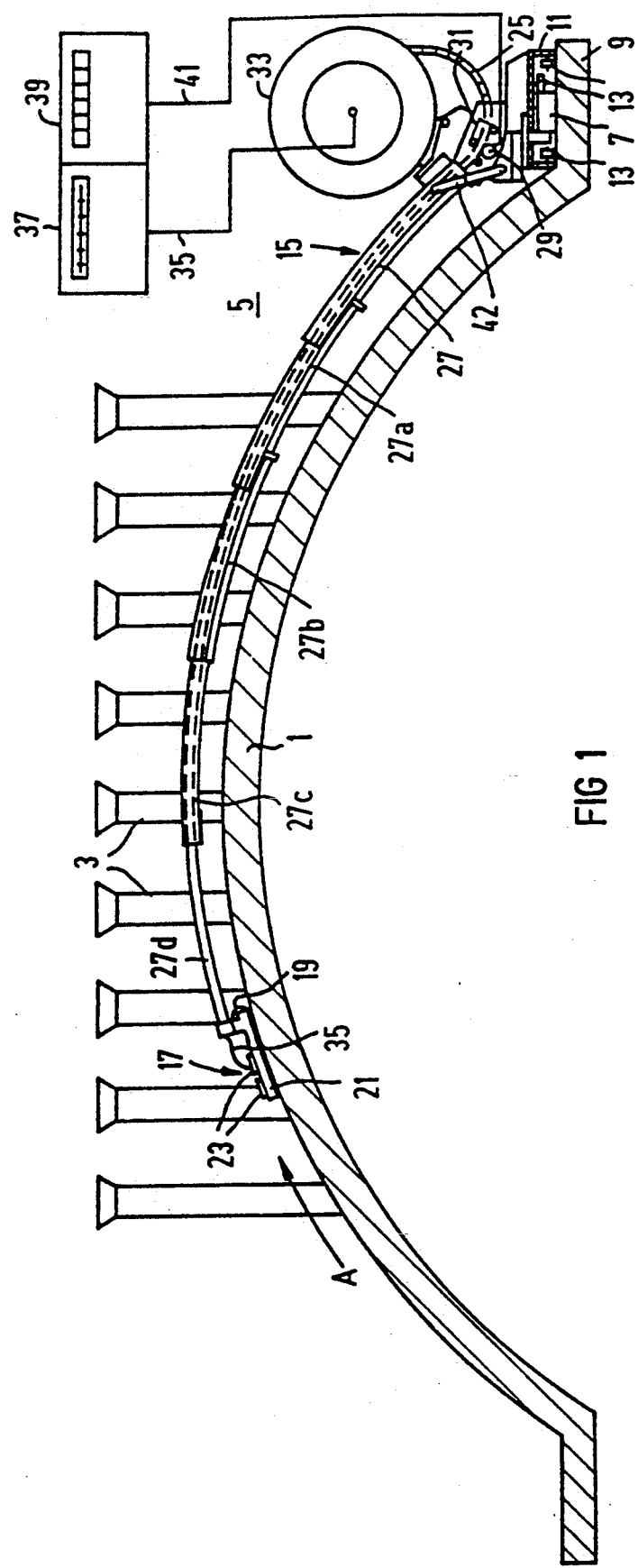
FIG. 1 is a diagrammatic, partly sectional, side-elevational view of an apparatus with an extended telescoping arm.

Referring now to the figures of the drawing in detail and first, particularly, to FIG. 1 thereof, there is seen a longitudinal section of a vessel wall. By way of example, the vessel wall is shown as a reactor pressure vessel lid 1, which has supports or posts 3 on the surface thereof, forming protrusions for control rod drive mechanisms. The reactor pressure vessel lid 1 provided with the protrusions has to be checked at regular intervals to determine if it is intact by means of test devices, in particular ultrasonic testers. To this end, an apparatus 5 is provided that is movable on a rail 7 disposed on the reactor pressure vessel lid 1. In the present case, the rail 7 is secured to a flange 9 of the lid 1. The rail may be detachably or solidly connected to the reactor pressure vessel lid 1. A suitable flange 9 may also be constructed as a rail.

A carriage 11 is located on the rail 7 and guided on the rail 7 by means of rollers 13 on the flange 9. An inclinable and swivelable telescoping arm 15 is pivotably attached to the carriage 11. The telescoping arm 15 is shown in an extended position. In the present example, the telescoping arm 15 has five members. The members are constructed with a curved shape and the number of members can be specified depending on the application. The length of the members is approximately 60 to 100 cm, for example. The total length of the telescoping arm 15 is adapted to the vessel wall and in the extended state is approximately 1.5-10 m, in particular 2.5 m. The members have a radius of curvature of approximately 2 to 10 m, in particular 2.5 m. A test unit 17 is attached to the free end of the telescoping arm 15. The telescoping arm 15 may be supported on the surface of the pressure vessel lid 1 by means of a support element 19, particularly a guide roller. A test unit 17 is equipped with a frame 21 which is pivotably attached to the telescoping arm 15, and test heads 23 which are suspended on the frame 21 by ball and socket joints. The test heads 23 are in particular constructed as ultrasonic test heads.

Since the surface of the reactor pressure vessel lid 1 is often only accessible with great difficulty because of insulation located above it, the apparatus 5 is made quite flat. To this end, members 27, 27a, 27b, 27c, 27d of the telescoping arm are made of curved U-shaped profile sections. The telescoping arm is thus adapted in shape to the surface of the lid 1 and to the working space above it, making testing possible even if the working space is very limited.

The telescoping arm 15 is extensible and retractable by means of a drive mechanism. To this end, a pusher tube 25, which is constructed in the form of a toothed belt and has tensile strength and resistance to compression, is disposed inside the telescoping arm 15. The pusher tube 25 is firmly joined to the last member 27d on the free end of the telescoping arm 15. At least one gear wheel of a gear mechanism 31 provided with a motor 29 engages the pusher tube 25 on the pivotably attached end of the telescoping arm 15. A drum 33 disposed on the pivotably attached end of the telescoping arm 15 is provided as a storage magazine for the end of the pusher tube 25 facing toward the carriage. This drum is rotatable by a non-illustrated drive mechanism, and its diameter is dimensioned to hold the pusher tube 25.

A data line 35 coming from the test unit 17 runs through the inside of the pusher tube 25, in order to protect the data line 35 from damage. Addition supply lines that may be needed can also be accommodated in the pusher tube 25. At the drum 33, the data line 35 is extended out of the pusher tube 25 to an evaluation unit 37. The apparatus is preferably connected to a control unit 39 that performs the control and positioning of the apparatus 5 through lines 41.

The telescoping arm 15 can be supported on the carriage 11 in the direction of inclination by a spring element 42, which may be varied in length by means of a pressure medium.

Figure 2:
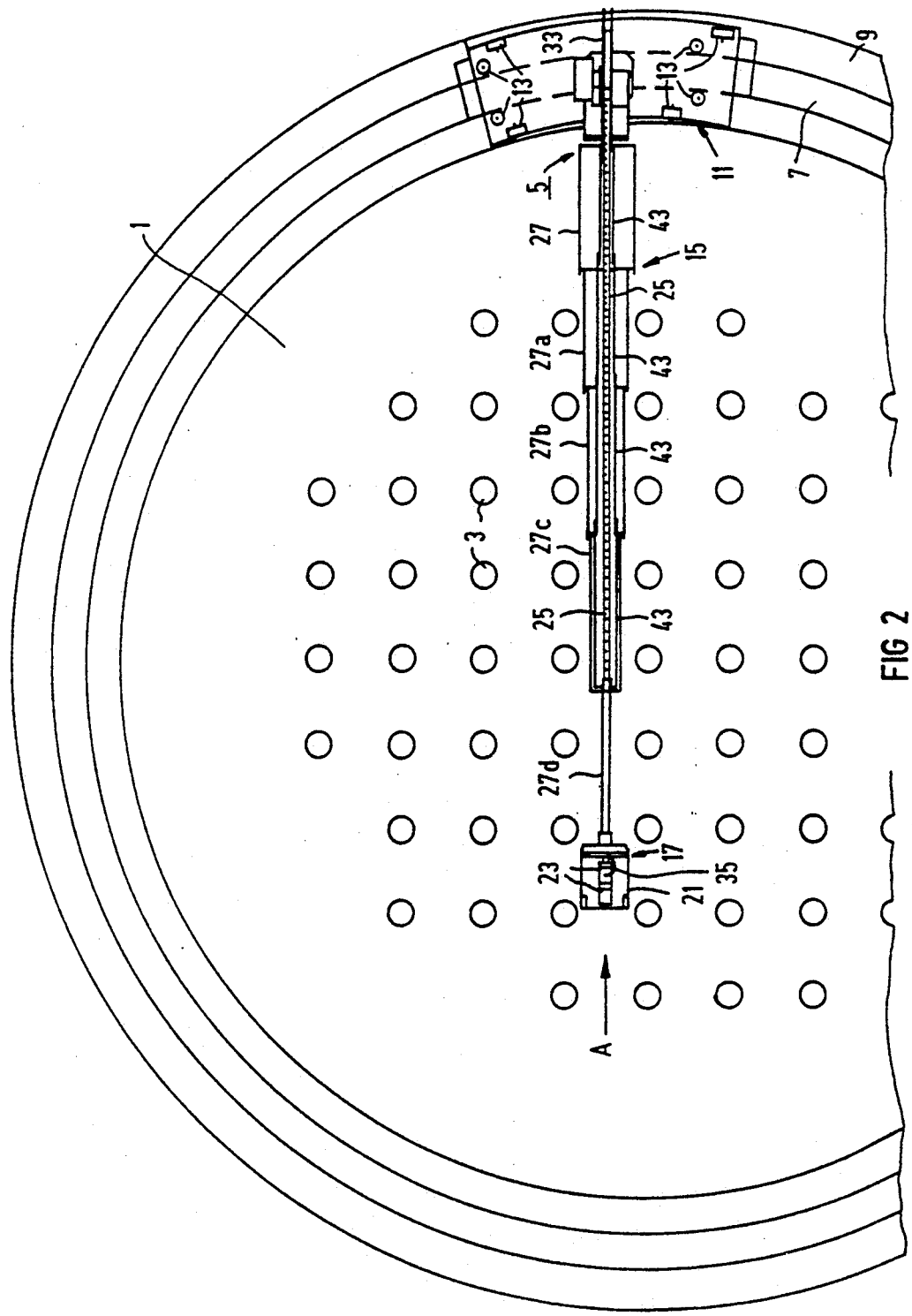
FIG. 2 is a fragmentary, top-plan view of the apparatus of FIG. 1.

FIG. 2 shows the apparatus 5 of FIG. 1 in a plan view. It can be seen that the telescoping arm 15 is guided in a lane or corridor A between the supports 3. The carriage 11 is adapted to the contour of the flange 9. The rail 7 on the flange 9 is circular. In order to enable passage through each lane, the telescoping arm 15 is swivelably disposed on the carriage 11. In order to position the telescoping arm 15, the carriage 11 is first moved to the front of the desired lane. Subsequently, the telescoping arm 15 is aligned in the direction of the lane. The test unit 17 can be driven far past the middle of the reactor pressure vessel lid 1 with the telescoping arm 15. In order to test the lid 1, the pusher tube 25 is then extended in order to extend the telescoping arm 15 and it is retracted in order to retract the telescoping arm 15.

In order to guide the pusher tube 25 inside the telescoping arm 15, guide conduits 43 which are nested within one another in telescoping fashion are disposed inside the telescoping arm 15. This advantageously improves the strength of the pusher tube 25 in the compression direction.

In order to retract the telescoping arm 15, the pusher tube 25 is moved toward the drum 33 by means of the gear mechanism 31, in the course of which the telescoping arm 15 is retracted one member at a time. In this process the pusher tube 25 is simultaneously wound onto the drum 33.

Figure 3:
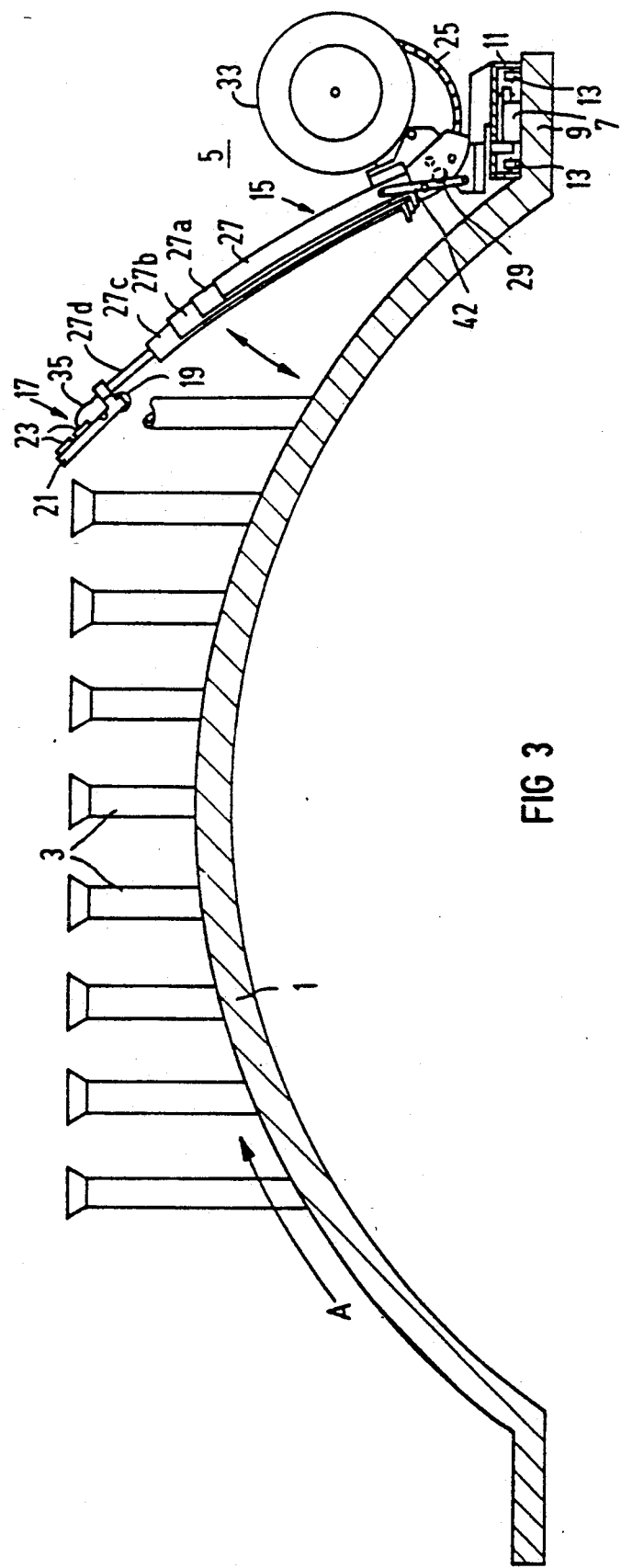
FIG. 3 is a fragmentary, partly sectional, side-elevational view of an apparatus with the telescoping arm retracted.

In FIG. 3, the apparatus 5 is shown with the telescoping arm 15 retracted and pointing upward. The pusher tube 25 is wound up on the drum 33. In order to position the apparatus 5 in the next lane between the supports 3, the telescoping arm 15 can be inclined in height, as shown. In this condition, the telescoping arm 15 is supported by the spring element 42.

Figure 4:
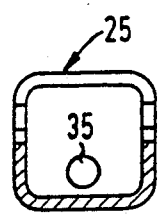
FIG. 4 is a cross-sectional view of a pusher tube taken along the line IV—IV of FIG. 5, in the direction of the arrows.

FIG. 4 is a sectional view of the pusher tube 25. The pusher tube 25 is advantageously square in cross section. The data line 35 can be seen inside the pusher tube.

Figure 5:
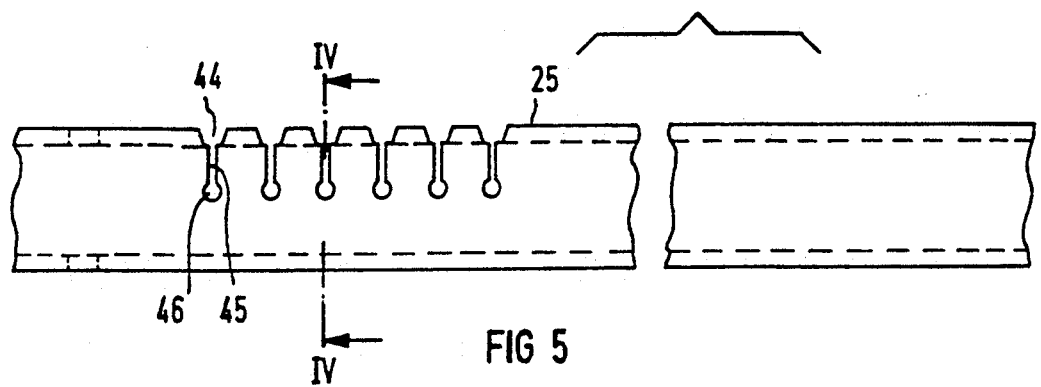
FIG. 5 is a fragmentary, side-elevational view of the pusher tube of FIG. 4.

FIG. 5 is a portion of the pusher tube or hose 25 as seen from the side. Recesses 44 form the toothed-belt type structure of the pusher tube 25. This permits force-locking engagement of a gear wheel of the gear mechanism 31 shown in FIG. 1. A force-locking connection is one which connects two elements together by force external to the elements, as opposed to a form-locking connection which is provided by the shapes of the elements themselves. The recesses 44 are also provided with transverse slits 45, which increases the flexibility of the pusher tube 25 so that it can be wound onto the drum 33. The pusher tube 25 is made of a suitable material, such as thermoplastic synthetic. In order to prevent cracking of the material at the bottom of the transverse slits 45, the slits have a rounded portion 46. The depth of the transverse slits 45 is approximately one-half the height of the pusher tube 25. This is done for the sake of adequate flexibility of the pusher tube 25 on one hand and for adequate rigidity in the tensile and thrusting direction of the pusher 25 on the other hand.

Figure 6:
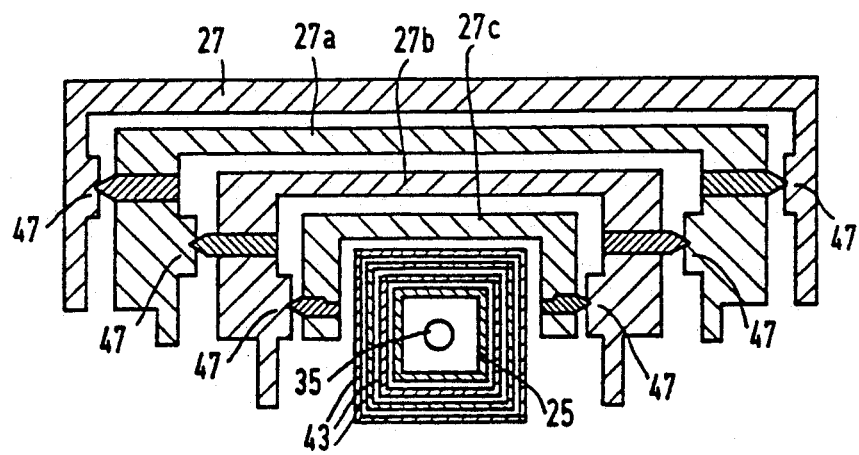
FIG. 6 is a cross-sectional view of a telescoping arm according to FIG. 3.

FIG. 6 shows the compressed telescoping arm 15 in cross section. In order to assure great strength of the telescoping arm 15 with low weight, the members 27, 27a, 27b, 27c of the telescoping arm 15 have a U-shaped cross section. In particular, the outer member 27 of the telescoping arm 15 has a width which is greater that its height. The members 27, 27a, 27b, 27c which are constructed in the form of a U profile section are provided with inwardly pointing guide elements 47 having grooves. The next narrower member is guided on each of the guide elements 47 by means of rails. It is also possible to construct the guide elements 47 in the form of rollers running on the rails. Both the guide channels 43 nested telescopingly in one another and the pusher tube 25 containing the data line 35 are disposed inside the telescoping arm 15.

We claim:

1. Apparatus for testing a vessel wall, comprising a rail, a carriage running on said rail, an inclining and swiveling telescoping arm having an end being pivotably connected to said carriage and a free end, said telescoping arm having curved members with U-shaped cross sections, a drive mechanism for extending and retracting said telescoping arm including a pusher tube having tensile strength and resistance to compression for driving said members in common and a motor for driving said pusher tube, a test unit carried by said free end of said telescoping arm, an evaluation unit, and a data line connected between said test unit and said evaluation unit.

2. Apparatus according to claim 1, including a drum rotatably disposed on said pivotably connected end of said telescoping arm, said pusher tube being a toothed belt in said telescoping arm having a first end connected to said free end of said telescoping arm and a second end guided on said drum, and said motor being part of a gear mechanism on said pivotably connected end of said telescoping arm for engaging said pusher tube.

3. Apparatus according to claim 1, wherein said data line runs through an inside of said pusher tube.

4. Apparatus according to claim 1, wherein said curved members with U-shaped cross sections have U-legs with ends and inwardly pointing guide elements on said ends of said U-legs.

5. Apparatus according to claim 1, wherein said curved members with U-shaped cross sections include an outer member having a width and a height, and wherein said width is greater than said height.

6. Apparatus according to claim 1, wherein said pusher tube has a square cross section and recesses formed therein.

7. Apparatus according to claim 1, wherein said pusher tube has recesses formed therein, transverse slits each having a bottom and being contiguous with a respective one of said recesses, and rounded portions each being contiguous with the bottom of a respective one of said transverse slits.

8. Apparatus according to claim 1, including guide channels nested telescopingly in one another inside said telescoping arm, said pusher tube being disposed in said guide channels.

9. Apparatus according to claim 1, wherein said curved members with U-shaped cross sections have a circular radius of approximately 2 to 10 m.

10. Apparatus according to claim 1, wherein said curved members with U-shaped cross sections have a circular radius of approximately 2.5 m.

11. Apparatus for testing a vessel lid having protrusions, comprising a rail disposed on a vessel lid, a carriage running on said rail, an inclining and swiveling telescoping arm having an end being pivotably connected to said carriage and a free end, said telescoping arm having curved members with U-shaped cross sections, a drive mechanism for extending and retracting said telescoping arm between protrusions on the lid including a pusher tube having tensile strength and resistance to compression for driving said members in common and a motor for driving said pusher tube, a test unit carried by said free end of said telescoping arm, an evaluation unit, and a data line connected between said test unit and said evaluation unit.

12. Apparatus for testing a vessel wall, comprising a rail, a carriage running on said rail, an inclining and swiveling telescoping arm having an end being pivotably connected to said carriage and a free end, said telescoping arm having curved members with U-shaped cross sections, and a drive mechanism for extending and retracting said telescoping arm including a pusher tube for driving said members in common and a motor for driving said pusher tube.

13. Method for testing a vessel surface, which comprises moving a carriage on a rail with a drive unit, inclining and swiveling a telescoping arm on the carriage, testing the vessel surface with a test unit disposed on a free end of the telescoping arm and connected through a data line to an evaluation unit, while moving the carriage and inclining and swiveling the telescoping arm, and extending and retracting the telescoping arm with a pusher tube connected to the telescoping arm and a motor connected to the pusher tube.

14. Method according to claim 13, which comprises moving the carriage along a wall of the vessel surface.

15. Method according to claim 13, which comprises moving the carriage along a lid of the vessel surface.

16. Method according to claim 13, which comprises moving the carriage along a lid of the vessel surface and inclining and swiveling the telescoping arm between protrusions on the lid.

17. Method according to claim 13, which comprises connecting the pusher tube to the free end of the telescoping arm.

* * * * *